2,793,116
PROCESS OF SINTERING MOLYBDENUM

Stuart V. Cuthbert, North Caldwell, and John W. Marden, Chester, N. J., assignors to the United States of America as represented by the Secretary of the Navy No Drawing. Application June 25, 1953,
Serial No. 364,213

1 Claim. (Cl. 75—224)

This invention relates to the manufacture of molybdenum suitable for use as lamp filaments or electric furnace resistor elements.

An object of the invention is to produce molybdenum of more uniform density and better grain structure than that produced by present methods.

A second object of the invention is to produce molybdenum possessing sufficient pliability to successfully withstand the cracking and breaking tendencies which are associated with presently known types of lamp filaments and resistors made from powdered and sintered refractory metals.

A third object is to produce a refractory metal such, for example, as molybdenum by a process involving prolonged heat treatment in a moist hydrogen atmosphere in contrast to the dry hydrogen heat treatment methods of the prior art.

A fourth object is to produce a refractory metal, such as molybdenum, by a process involving heat treatment at slowly rising temperatures within the critical range, that is the range where maximum molecular change occurs, followed by additional heat treatment for a relatively long period at a temperature above said critical range and approaching the melting point.

A fifth object is to subject compressed powdered molybdenum to prolonged heat treatment totaling more than fifty hours divided into three stages, each of which stages is of at least fifteen hours' duration; the three stages involving three distinct temperature ranges with the final stage occurring at a temperature above 1700° C.

Other objects and many of the attendant advantages of this invention will be readily appreciated as the same becomes better understood by reference to the following detailed description.

The findings of recent experiments on the heat treatment of mechanically or hydrostatically pressed molybdenum powder have resulted in a sintering schedule which insures a more fully coalesced material, which can be fabricated more easily.

With increasing sizes of pressed shapes of powder the standard heat treat schedule applicable to relatively large ingots has become more and more unsatisfactory and results in:

1. Lower average density
2. Lower percentage of linear shrinkage
3. Nonuniform density over a cross-sectional area
4. Cracking and breaking during fabrication A series of experiments were conducted on small discs of pressed powder machined to accurate dimensions. These discs were subjected to heat treatment in moist hydrogen atmosphere furnaces at various combinations of temperature and time. The specific gravities, linear dimensional changes, and grain count were recorded. The tests indicated the following steps to be desirable.

For example, with a relatively large hydrostatically compressed bar or ingot having dimensions of 2¼" x 3½" x 20", the most effective heating schedule was found to be:

1. From 30° C. to 1150° C. in 15 hours
2. From 1150° C. to 1400° C. in 8 hours
3. From 1400° C. to 1500° C. in 12 hours
4. From 1500° C. to 1700° C. in 4 hours
5. Above 1700° C. for 25 hours Considering steps 2, 3 and 4 to be parts of a single intermediate stage (since the temperatures embraced thereby are all in the critical intermediate range), it will be seen that the heating schedule actually resolves itself into a three-stage process which may be described as follows:

1. Preliminary stage of 15 hours' duration
2. Intermediate stage of 24 hours' duration
3. Final stage of 25 hours' duration It will also be observed that each stage of heating involves a distinct temperature range with the final stage being conducted at a temperature approaching the melting point of molybdenum. This final stage may occur in a single continuous maximum heat application, or it may be broken into two or more substages where facilities for maintenance of such high heat continuously are not available. Thus, for example, if there is danger in maintaining temperatures above 1700° C. throughout night hours when skilled supervisory help may not be available, the temperature may be lowered for such night periods to, say, 1500° C., then returned to above 1700° C. during the daytime hours until a total of 25 hours of superheating has been achieved. A moist hydrogen atmosphere should be maintained constantly.

Ingots or bars of the size hereinbefore indicated will have the following properties as a result of being heat treated in the manner described: a density of 9.9 to 10.05 gram per cubic centimeter; a linear shrinkage characteristic of approximately 18 percent; and a grain count below 10,000 grains per square millimeter. The metal is much more satisfactory for working into fine filament shapes, and is decidely less susceptible to cracking and breaking than are similar metals produced in accordance with the shorter and less intense heat treating schedules heretofore employed in dry hydrogen atmospheres.

Obviously many modifications and variations of the present invention are possible in the light of the above teachings. It is therefore to be understood that within the scope of the appended claim the invention may be practiced otherwise than as specifically described.

What is claimed is:

A method of producing an ingot of molybdenum from molybdenum powder, comprising pressing molybdenum powder into an ingot shape, heat treating said ingot in an atmosphere of moist hydrogen at slowly rising temperatures within the temperature range of from 30° C. to 1150° C. in 15 hours, further heating said ingot within the critical range of 1150° C. to 1700° C. for a period of at least 24 hours, the heating schedule within said critical range consisting of heating said ingot from 1150° C. to 1400° C. in 8 hours, then from 1400° C. to 1500° C. in 12 hours, and finally from 1500 C. to 1700° C. in 4 hours, and additionally heating said ingot for a total period of at least 25 hours at a temperature above said critical range of 1150° C. to 1700° C. and approaching the melting point of the ingot until the latter possesses a uniform density, a uniform grain size, and a characteristic of pliability which, when formed into lamp filaments, provides high resistance toward breaking or cracking.

References Cited in the file of this patent
UNITED STATES PATENTS

| | | |
|---|---|---|
| 1,110,303 | Kreusler | Sept. 8, 1914 |
| 1,343,976 | Liebmann et al. | June 22, 1920 |
| 2,215,645 | Iredell et al. | Sept. 24, 1940 |
| 2,431,690 | Hall et al. | Dec. 2, 1947 |